US012807135B2

(12) United States Patent

Kageyama et al.

(10) Patent No.: US 12,807,135 B2
(45) Date of Patent: Nov. 24, 2026

(54) VEHICLE CONTROL METHOD AND VEHICLE CONTROL DEVICE

(71) Applicant: Panasonic Automotive Systems Co., Ltd., Kanagawa (JP)

(72) Inventors: Kenta Kageyama, Tokyo To (JP); Hirofumi Nishimura, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 74 days.

(21) Appl. No.: 19/081,727

(22) Filed: Mar. 17, 2025

(65) Prior Publication Data

US 2025/0296553 A1 Sep. 25, 2025

(30) Foreign Application Priority Data

Mar. 22, 2024 (JP) ................................ 2024-046005

(51) Int. Cl.

*B60W 30/06* (2006.01)
*B60W 10/20* (2006.01)
*B60W 50/14* (2020.01)
*G06V 20/58* (2022.01)

(52) U.S. Cl.

CPC ............ *B60W 30/06* (2013.01); *B60W 10/20* (2013.01); *B60W 50/14* (2013.01); *G06V 20/586* (2022.01); *B60W 2050/143* (2013.01); *B60W 2050/146* (2013.01); *B60W 2420/403* (2013.01); *B60W 2520/10* (2013.01)

(58) Field of Classification Search

CPC ...... B60W 30/06; B60W 10/20; B60W 50/14; B60W 2050/143; B60W 2050/146; B60W 2420/403; B60W 2520/01; G06V 20/586

USPC ...................................................... 340/932.2

See application file for complete search history.

(56) References Cited

U.S. PATENT DOCUMENTS

2019/0054927 A1* 2/2019 Hayakawa ............... G08G 1/14
2019/0129412 A1* 5/2019 Kim ...................... G05D 1/0016
2019/0291721 A1* 9/2019 Sakano ................. B60W 30/06
2021/0300190 A1* 9/2021 Iwamoto ................. H02J 50/90

FOREIGN PATENT DOCUMENTS

JP 7120036 8/2022

* cited by examiner

*Primary Examiner* — Kerri L Mcnally
(74) *Attorney, Agent, or Firm* — Greenblum & Bernstein, P.L.C.

(57) ABSTRACT

A vehicle control device according to an embodiment is provided in a vehicle to communicate with an operation device, a camera, a monitor, and a movement control device of the vehicle. The vehicle control device causes the vehicle to execute autonomous traveling to a target parking position along a teaching route obtained by teaching traveling from a first position to a target parking position. When the vehicle is in a predetermined range from a second position on the teaching route during manual travel, the monitor is controlled to display a first indication indicating that the vehicle is in the vicinity of a place where automatic parking is possible. When the vehicle is located at a third position closer to the target parking position than the second position, the monitor is controlled to display a second indication indicating that autonomous traveling is possible up to the target parking position.

20 Claims, 13 Drawing Sheets

D1

| | INDEX | TRAVEL POSITION | AZIMUTH | TRAVEL DIRECTION | REFERENCE TRAVEL INFORMATION |
|---|---|---|---|---|---|
| START POINT | 300 | X300, Y300 | θ300 | FORWARD | Φ300, γ300 |
| | 299 | X299, Y299 | θ299 | FORWARD | Φ299, γ299 |
| | 298 | X298, Y298 | θ298 | FORWARD | Φ298, γ298 |
| | ⋮ | | | | |
| | 3 | X3, Y3 | θ3 | BACKWARD | Φ3, γ3 |
| | 2 | X2, Y2 | θ2 | BACKWARD | Φ2, γ2 |
| END POINT | 1 | X1, Y1 | θ1 | BACKWARD | Φ1, γ1 |

VEHICLE CONTROL METHOD AND VEHICLE CONTROL DEVICE

CROSS-REFERENCE TO RELATED APPLICATIONS

This application is based upon and claims the benefit of priority from Japanese Patent Application No. 2024-046005, filed on Mar. 22, 2024, the entire contents of which are incorporated herein by reference.

FIELD

The present disclosure relates generally to a vehicle control method and a vehicle control device.

BACKGROUND

In general, there are many narrow parking spaces in a house, and it may be difficult to park a vehicle. Therefore, there is a high need to perform parking and unloading by automatic driving.

A vehicle control device that implements such a type of automatic driving has been known.

A related art has been disclosed (see, for example, a patent literature JP 7120036 B2), in which a vehicle is caused to travel from a predetermined position outside a parking area to a target parking position by a driving operation of a driver, a movement route at that time is stored in advance as a teaching route, and the vehicle is caused to autonomously travel along the teaching route in a parking scene after that.

However, in the conventional technique, when the automatic driving is started, the vehicle is stopped at the start position of the automatic driving once, and then the automatic driving is started. Therefore, there is a case where a temporary stop is troublesome, and there is room for further improvement.

Therefore, improvement of convenience for drivers is desired.

SUMMARY

A vehicle control method according to one aspect of the present disclosure is implemented by a computer of a vehicle control device provided in a vehicle. The vehicle includes an operation device to receive an operation of an occupant, a camera to acquire a surrounding image, a monitor being visually recognized by the occupant, and a movement control device to control at least steering. The vehicle control method is implemented for causing the vehicle to execute autonomous traveling to a target parking position by controlling the at least steering based on at least the surrounding image along a teaching route obtained by teaching traveling from a first position to the target parking position. The vehicle control method includes causing the monitor to display a first indication indicating that the vehicle is in the vicinity of a place where automatic parking is possible. The first indication is displayed in a case where the vehicle is in a predetermined range from a second position on the teaching route during manual travel of the vehicle by driving of the occupant. The vehicle control method includes causing the monitor to display a second indication indicating that autonomous traveling is possible up to the target parking position. The second indication is displayed in a case where the vehicle is located at a third position on the teaching route that is closer to the target parking position than the second position. The third position is away from the first position by a predetermined distance or after traveling for a predetermined time from the second position as a starting point. The vehicle control method includes controlling, when the operation device receives a predetermined operation, at least steering based on at least the surrounding image to cause the vehicle to autonomously travel from a fourth position that is closer to the target parking position than the third position on the teaching route to the target parking position.

DETAILED DESCRIPTION

Hereinafter, embodiments of a vehicle control method and a vehicle control device according to the present disclosure will be described with reference to the drawings.

Overall Configuration of Vehicle

Figure 1:
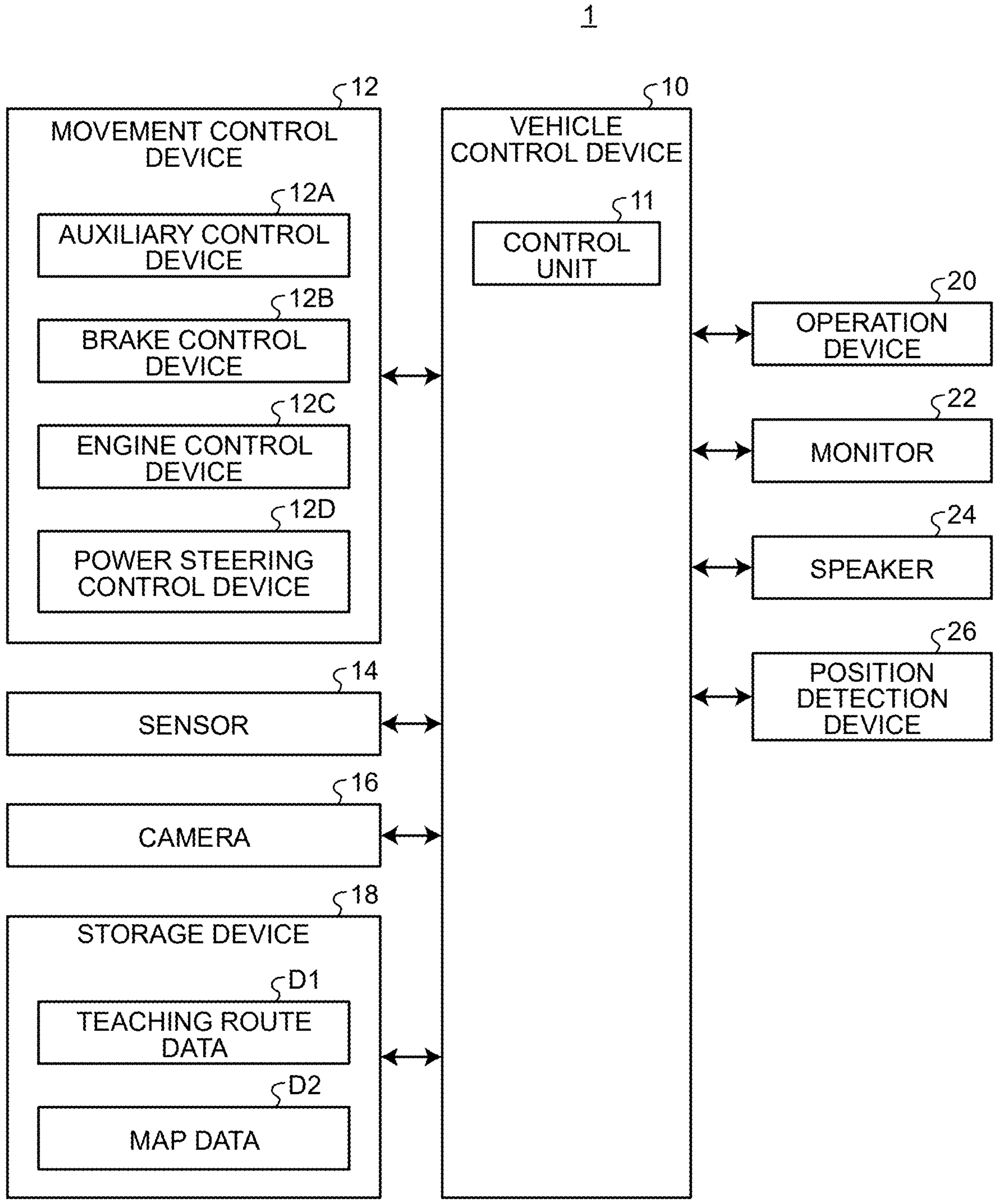
FIG. 1 is a block diagram illustrating an example of an overall configuration of a vehicle according to an embodiment.

FIG. 1 is a block diagram illustrating an example of an overall configuration of a vehicle 1 according to an embodiment.

The vehicle 1 includes a vehicle control device 10, a movement control device 12, a sensor 14, a camera 16, a storage device 18, an operation device 20, a monitor 22, a speaker 24, and a position detection device 26.

The movement control device 12, the sensor 14, the camera 16, the storage device 18, the operation device 20, the monitor 22, the speaker 24, and the position detection device 26 are connected to the vehicle control device 10 so as to be able to exchange data or signals. That is, the vehicle control device 10 is set to be communicably connected to at least the movement control device 12, the camera 16, the operation device 20, and the monitor 22.

The movement control device 12 controls at least steering of the vehicle 1. The movement control device 12 is a means for implementing driving, braking, and turning motions necessary for traveling of the vehicle 1. In one example, the movement control device 12 includes a drive motor, a power transmission mechanism, a brake device, a steering device, and the like, and an electronic vehicle control device that controls the drive motor, the power transmission mechanism, the brake device, the steering device, and the like. The movement control device 12 causes the vehicle 1 to travel by, for example, generating power with a drive motor and transmitting the power to wheels via a power transmission mechanism. The power transmission mechanism is, for example, a propeller shaft, a differential gear, a drive shaft, or the like.

Specifically, the movement control device 12 includes an auxiliary control device 12A, a brake control device 12B, an engine control device 12C, and a power steering control device 12D. The brake control device 12B, the engine control device 12C, and the power steering control device 12D can be collectively referred to as an actuator control unit that controls the operation of the vehicle 1.

The auxiliary control device 12A is a control device that monitors the transmission state of the vehicle control device 10 and operates to execute appropriate fallback control as a backup when the vehicle control device 10 fails. Note that even in a case where the vehicle control device 10 fails, if safety can be secured by providing a fallback control function in the vehicle control device 10, the fallback control is unnecessary.

The brake control device 12B is a control device that performs brake control (braking force control) of the vehicle 1. For example, the brake control device 12B performs brake control of the vehicle 1 in accordance with enhancement (pressing) and release of the operation of the brake pedal (brake operation unit) by an occupant. Moreover, the brake control device 12B performs brake control according to a peripheral image V during autonomous traveling.

The engine control device 12C is a control device that controls an engine that generates a driving force of the vehicle 1. The power steering control device 12D is a control device that controls power steering of the vehicle 1.

The sensor 14 includes various sensors that are provided in the vehicle 1 to detect a traveling state of the vehicle 1 and a state around the vehicle 1. The sensor 14 includes, for example, an accelerator opening sensor that detects an accelerator opening, a steering angle sensor that detects a steering angle of a steering device, an acceleration sensor that detects acceleration acting in the front-rear direction of the vehicle 1, a torque sensor that detects torque acting on a power transmission mechanism between wheels of the vehicle 1 and a drive motor, a vehicle speed sensor that detects a vehicle speed of the vehicle 1, a wheel speed sensor, and the like. Moreover, the sensor 14 includes a light detection and ranging (LiDAR), a radar, an ultrasonic sensor, or the like. The sensor 14 outputs sensor information obtained by the detection to the vehicle control device 10.

The camera 16 is a surrounding sensor that is provided in the vehicle 1 to monitor the surrounding environment of the vehicle 1. In the present embodiment, the camera 16 captures an image of the surroundings of the vehicle 1, and sequentially outputs the captured image to the vehicle control device 10. In the present embodiment, the camera 16 outputs, to the vehicle control device 10, a surrounding image including a plurality of captured images along a time series obtained by capturing the surroundings of the vehicle 1 along the time series. The camera 16 acquires a surrounding image. Hereinafter, the surrounding image may be simply referred to as an image. Moreover, in the present embodiment, the camera 16 is also applied to an application of detecting an object present around the vehicle 1 and estimating the position of the vehicle 1 from the positional relationship between the vehicle 1 and the object present around the vehicle 1.

The position, the number of installations, and the imaging direction of the camera 16 are adjusted in advance so that the surrounding of the vehicle 1 can be imaged. In one example, the vehicle 1 is provided with four cameras 16 arranged so as to be able to image four directions of the front direction, the rear direction, the left direction, and the right direction of the vehicle 1. Note that the number of cameras 16 provided in the vehicle 1 is not limited to four.

The storage device 18 stores various data. In the present embodiment, the storage device 18 stores data such as teaching route data D1 and map data D2. Details of the teaching route data D1 and the map data D2 will be described later. The storage device 18 is, for example, an auxiliary storage device such as a hard disk drive (HDD), a solid state drive (SSD), or a flash memory.

The operation device 20 acquires an input operation of the occupant. The operation device 20 is, for example, an input device such as a handle, an accelerator pedal, a brake pedal, a blinker pedal, a push-in switch, a keyboard, or a touch panel.

The monitor 22 is a display device that displays various types of information. The monitor 22 is installed at a position visible to a user who is an occupant of the vehicle 1. Examples of the display include a liquid crystal display (LCD), an organic electro-luminescence (EL) display, and a projector. The display may be a touch panel display in which the monitor 22 and a keyboard or a touch panel are integrally formed. The monitor 22 is an example of the HMI.

The display area of the monitor 22 is not limited to a single area. The monitor 22 may include two or more display areas. In addition, the vehicle 1 may include a plurality of monitors 22.

The speaker 24 emits sound toward the occupant. The speaker 24 is a device configured to be able to output sound. The speaker 24 can output a predetermined notification as a voice. The speaker 24 is provided in the vehicle 1 so that the driver of the vehicle 1 can listen to the output sound. In the present embodiment, the voice is not limited to a language, and includes a notification sound or a warning sound.

The position detection device 26 detects at least latitude and longitude. For example, the position detection device 26 is a device that detects latitude and longitude information indicating the latitude and longitude of the position of the vehicle 1 on the basis of a GPS signal received by a GPS antenna. The GPS antenna is an antenna capable of receiving a GPS signal.

Figure 2:
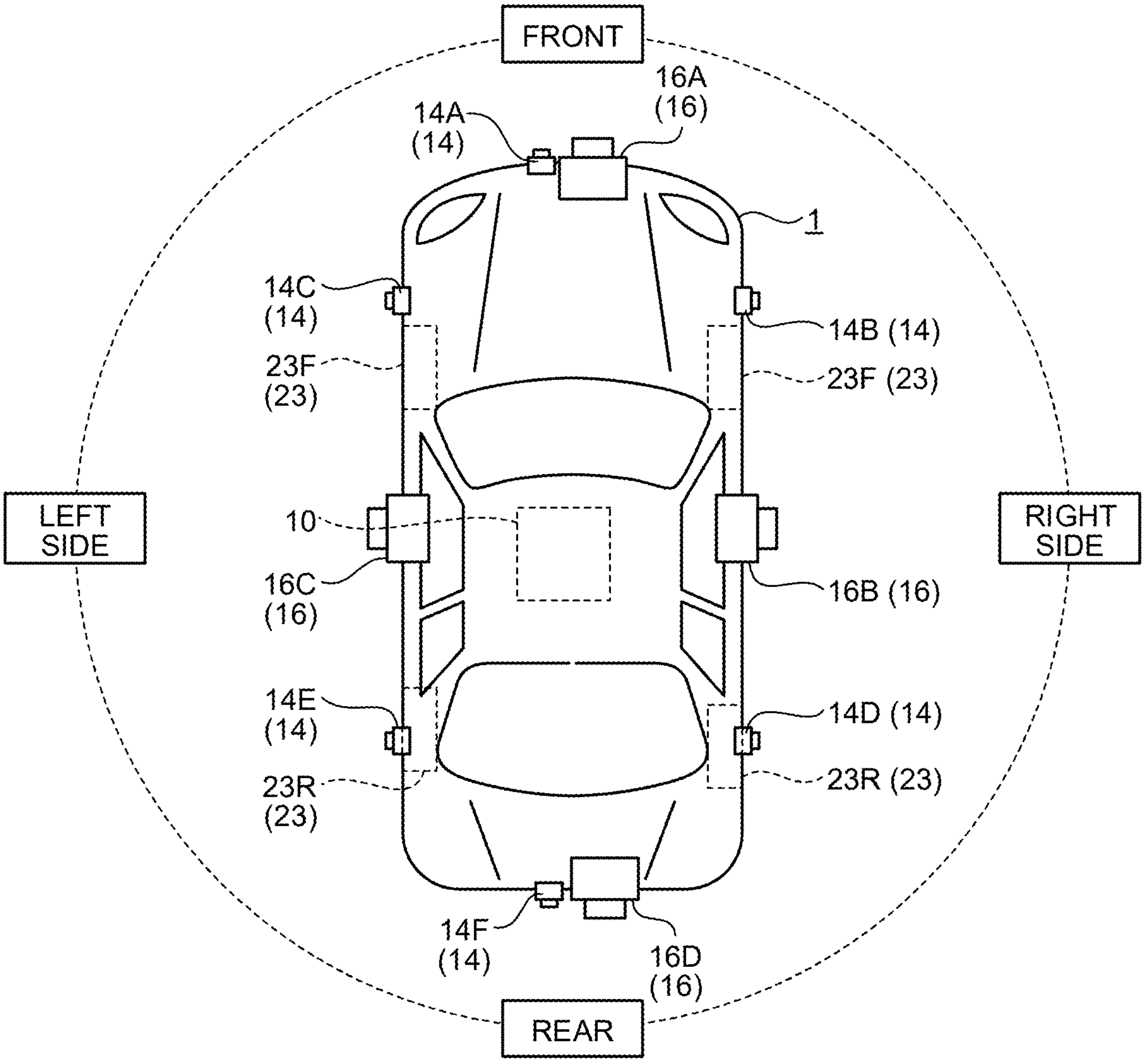
FIG. 2 is an explanatory diagram of an example of arrangement of sensors and cameras.

FIG. 2 is an explanatory diagram of an example of arrangement of the sensor 14 and the camera 16.

The vehicle 1 is provided with, for example, four cameras 16 (cameras 16A to 16D) so as to be able to acquire a situation outside the vehicle 1 in at least four directions of the front, rear, right side, and left side of the vehicle 1, for example.

Figures 5, 6:
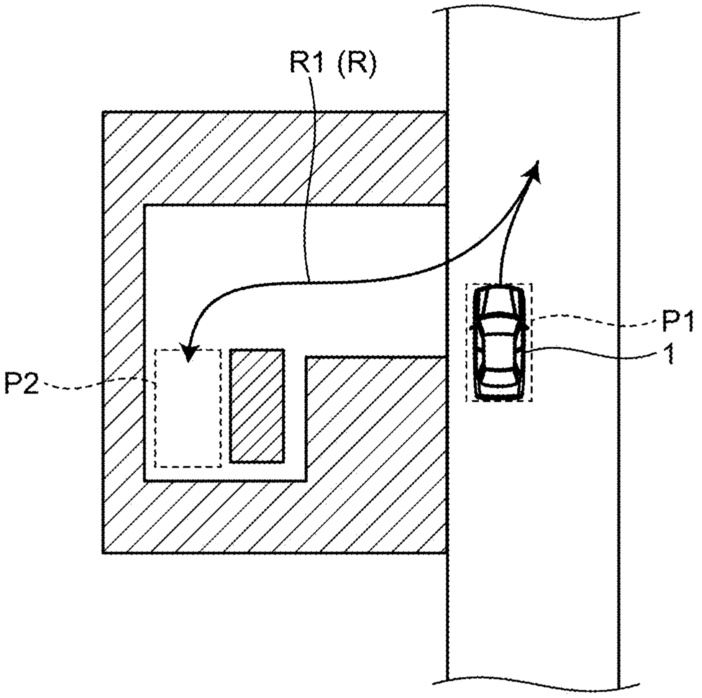
FIG. 5 is an explanatory diagram of an example of a teaching route according to an embodiment.
FIG. 6 is a diagram illustrating an example of a data configuration of teaching route data according to an embodiment.

Specifically, the camera 16 includes a camera 16A, a camera 16B, a camera 16C, and a camera 16D. The camera 16A is disposed in a front part of the vehicle 1 and captures an image of the front of the vehicle 1. The camera 16B is disposed on the right side of the vehicle 1 and captures an image of the right side of the vehicle 1. The camera 16C is disposed on the left side of the vehicle 1 and captures an image of the left side of the vehicle 1. The camera 16D is disposed in a rear part of the vehicle 1 and captures an image of the rear of the vehicle 1. Note that the number of cameras 16 provided in the vehicle 1 is not limited to four. In addition, regarding sensors that detect objects such as a lidar, a radar, a sonar, and an ultrasonic sensor included in the sensor 14, it is preferable that the arrangement positions, the number of arrangements, and the like are adjusted in advance so that the external situations of the right side, the left side, the front, and the rear of the vehicle 1 can be acquired. As illustrated in FIG. 6, the sensor 14 includes sensors 14A to 14F. These sensors 14A to 14F are disposed in the vehicle 1 so as to be able to acquire external situations of the right side, the left side, the front side, and the rear side of the vehicle 1. Note that the sensor 14 that detects an object, such as a lidar, a radar, a sonar, or an ultrasonic sensor, may be disposed only in the rear part of the vehicle 1.

Next, a configuration of the vehicle 1 will be described.

Figure 3:
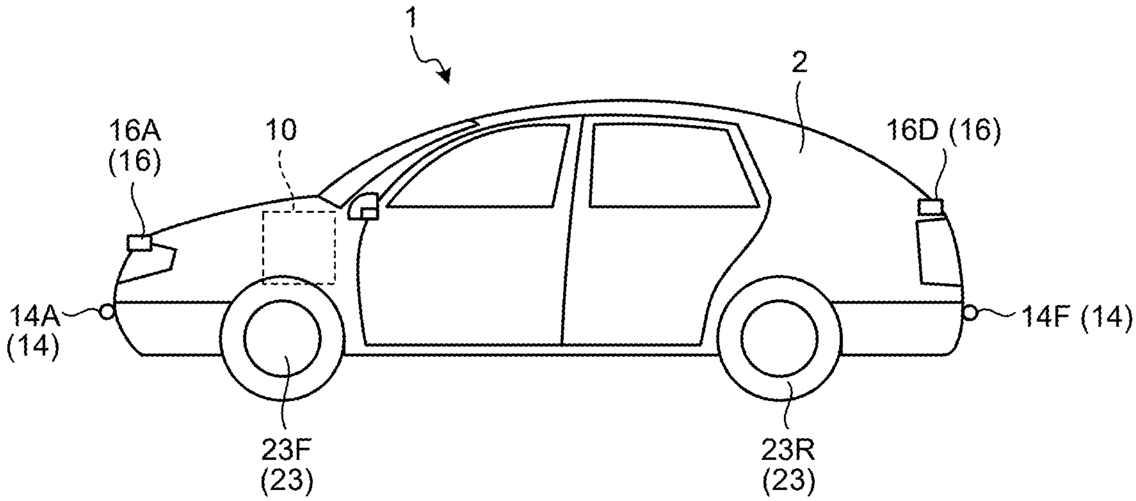
FIG. 3 is a schematic diagram illustrating an example of a configuration of the vehicle.

FIG. 3 is a schematic diagram illustrating an example of a configuration of the vehicle 1.

The vehicle 1 includes a vehicle body 2 and two pairs of wheels 23 arranged along a predetermined direction on the vehicle body 2. The two pairs of wheels 23 include a pair of front tires 23F and a pair of rear tires 23R (see also FIG. 2). In FIGS. 2 and 3, an example in which the vehicle 1 includes four wheels 23 is illustrated. However, the number of wheels 23 provided in the vehicle 1 is not limited thereto.

Next, a configuration in the vicinity of the driver's seat of the vehicle 1 of the present embodiment will be described.

Figure 4:
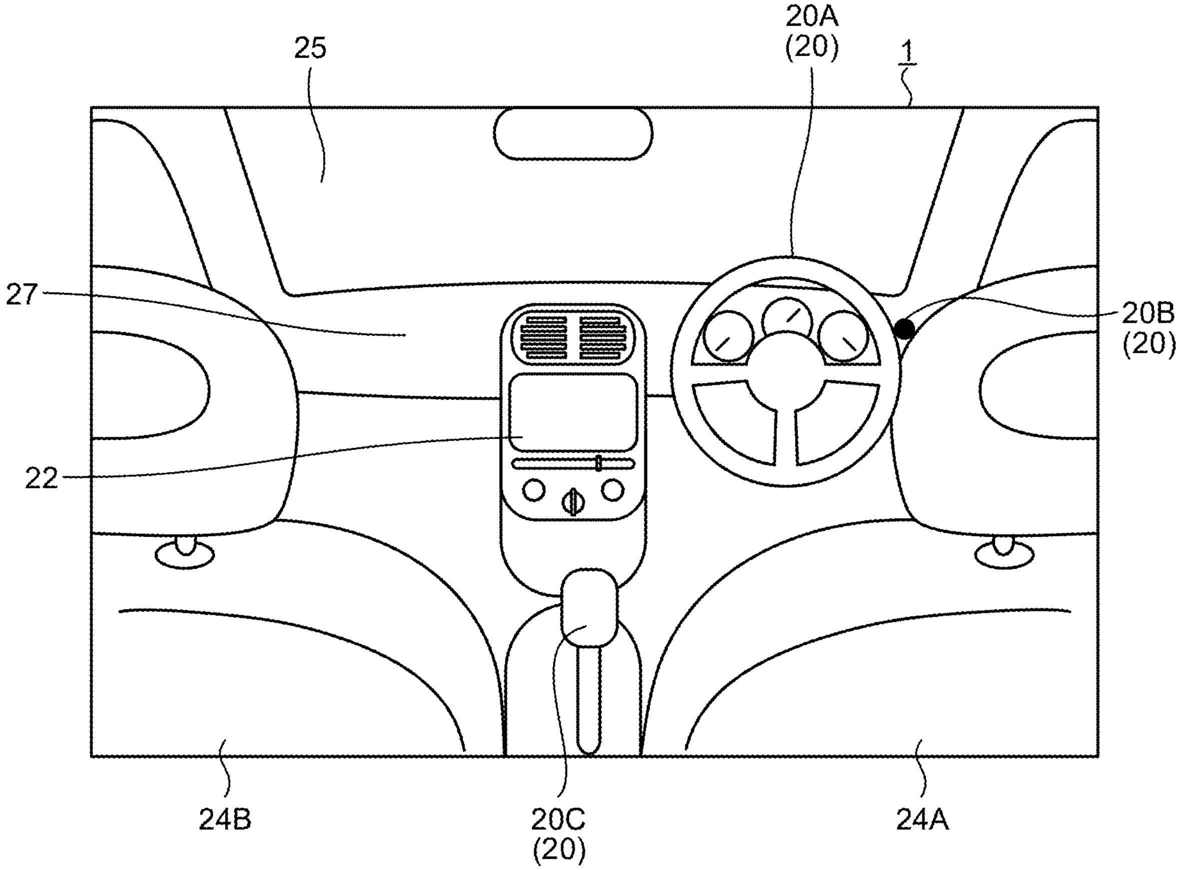
FIG. 4 is a diagram illustrating an example of a configuration in the vicinity of a driver's seat of the vehicle according to an embodiment.

FIG. 4 is a diagram illustrating an example of a configuration in the vicinity of a driver's seat 24A of the vehicle 1 according to an embodiment.

The vehicle 1 includes the driver's seat 24A and a passenger seat 24B. A windshield 25, a dashboard 27, a steering wheel (steering operation unit, steering wheel) 20A, an operation button 20B, and the monitor 22 are provided in front of the driver's seat 24A. A shift lever 20C, which is a lever for shifting the transmission, is provided near the driver's seat 24A.

The steering wheel 20A, the operation button 20B, and the shift lever 20C are examples of the operation device 20.

The steering wheel 20A is provided in front of the driver's seat 24A and can be operated by an occupant. The rotation angle of the steering wheel 20A, namely, the steering angle is electrically or mechanically interlocked with the change in the direction of the front tire 23F, which is a steering wheel. Note that the steering wheel may be the rear tire 23R, or both the front tire 23F and the rear tire 23R may be the steering wheel.

Figure 8:
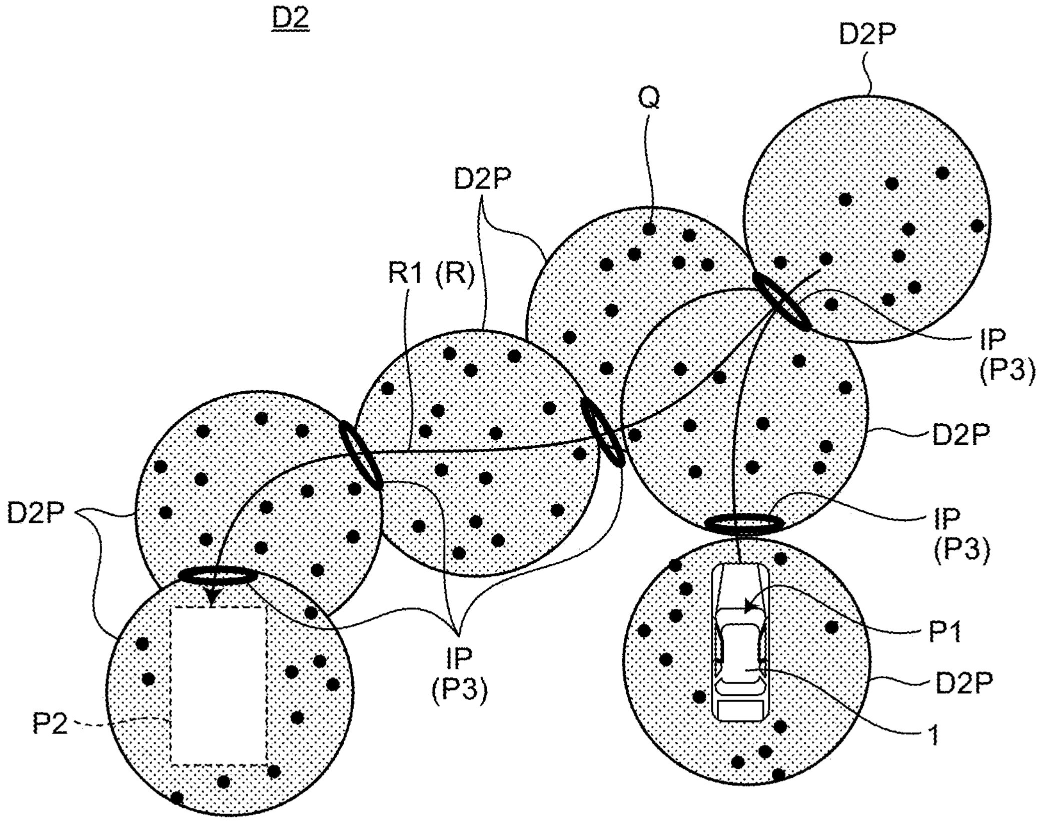
FIG. 8 is a schematic diagram of an example of map data according to an embodiment.

The operation button 20B is a button capable of receiving an operation by the occupant. The operation button 20B may include a direction indicator. The position of the operation button 20B is not limited to the example illustrated in FIG. 8, and may be provided, for example, on the steering wheel 20A. In addition, although one operation button 20B is illustrated in FIG. 8, a plurality of operation buttons 20B may be provided. In a case where the monitor 22 also serves as a touch panel, the monitor 22 may be an example of the operation device 20.

Returning to FIG. 1, the description will be continued.

The vehicle control device 10 is an electronic control unit that integrally controls each unit of the vehicle 1.

The vehicle control device 10 controls the movement control device 12 so that the traveling state of the vehicle 1 is optimized by using the sensor information, the image, and the like received from the sensor 14 and the camera 16, respectively. In addition, the vehicle control device 10 controls the movement control device 12 to cause the vehicle 1 to autonomously travel.

The vehicle control device 10 includes a control unit 11. A part or all of the control unit 11 may have a software configuration implemented by cooperation of a processor and various programs stored in a memory. In addition, a part or all of the control unit 11 may have a hardware configuration implemented by a dedicated circuit or the like.

The control unit 11 integrally controls each unit of the vehicle 1.

In the present embodiment, the control unit 11 is configured to be able to switch the travel mode to a teaching travel mode or an autonomous travel mode on the basis of an input operation or the like of the operation device 20 by the user. The traveling mode executable by the vehicle 1 may include various travel modes other than the teaching travel mode and the autonomous travel mode.

The teaching travel mode is a mode for registering a teaching route when the vehicle 1 autonomously travels. The teaching route is a route obtained by teaching traveling from the first position to the target parking position. In the teaching travel mode, the vehicle 1 is controlled to travel by the driving operation of the user. That is, in the teaching travel mode, the control unit 11 controls the movement control device 12 to travel in accordance with the driving operation by the user.

The autonomous travel mode is a mode in which the vehicle 1 autonomously travels. In the present embodiment, the autonomous travel mode means a mode in which the vehicle 1 autonomously travels along the teaching route. In the autonomous travel mode, the control unit 11 controls at least steering to control the movement control device 12 to travel along the teaching route. In the autonomous travel mode, the vehicle 1 is automatically controlled to travel by the vehicle control device 10 without through the driving operation of the user.

FIG. 5 is an explanatory diagram of an example of a teaching route R1 according to an embodiment.

In the teaching travel mode, the teaching traveling from a first position P1 to a target parking position P2 is performed by the driving operation by the user. The target parking position P2 is, for example, a parking lot or the like, but is not limited thereto. Further, the first position P1 may be any position of the user in the real space.

A travel route R traveled by the teaching travel is treated as a teaching route R1, and the teaching route data D1 of the teaching route R1 is stored in the storage device 18. During the teaching travel, the user may perform a driving operation to travel from the target parking position P2 toward the first position P1, or may perform a driving operation to travel from the first position P1 toward the target parking position P2.

When the vehicle 1 travels from the target parking position P2 toward the first position P1 in the teaching travel mode, the control unit 11 may create the teaching route data D1 of the teaching route R1 in which the travel direction of the travel route R during the teaching travel is set to the reverse direction. When the vehicle 1 travels from the first position P1 toward the target parking position P2 during the teaching travel, the control unit 11 may create the teaching route data D1 of the teaching route R1 along the travel direction of the travel route R during the teaching travel. Details of the creation of the teaching route data D1 will be described later.

In the autonomous travel mode, the control unit 11 controls at least steering based on at least the surrounding image along the travel route R obtained by the teaching travel from the first position P1 to the target parking position P2, and causes the vehicle 1 to autonomously travel to the target parking position P2. In the autonomous travel mode, the control unit 11 executes steering control of the vehicle 1 and front and rear acceleration/deceleration control, but at least part of front and rear acceleration/deceleration control may be executed by a driver's operation.

Next, the control by the control unit 11 in each of the teaching travel mode and the autonomous travel mode will be described in detail.

In Teaching Travel Mode

The control of the control unit 11 in the teaching travel mode will be described in detail.

The control unit 11 switches the traveling mode to the teaching travel mode when receiving a signal indicating an instruction to start the teaching travel mode by the operation of the operation device 20 by the user. Then, the control unit 11 executes the following processing in the teaching travel mode.

The control unit 11 acquires sensor information indicating a traveling state of the vehicle 1 from the sensor 14. Then, the control unit 11 estimates the current position of the vehicle 1 on the basis of a temporal change in the sensor value indicated by the sensor information. In one example, the control unit 11 calculates a movement amount of the vehicle 1 from a reference position such as a traveling start position when the teaching travel mode is started on the basis of a temporal change in the vehicle speed and the yaw rate represented by the sensor values, and estimates the current position of the vehicle 1 based on the movement amount.

Note that the estimation accuracy of the current position based on the movement amount may be low. Therefore, the control unit 11 may use, as the current position, a result of correcting the estimated current position on the basis of the image around the vehicle 1 acquired by the camera 16.

The control unit 11 sequentially stores the current position of the vehicle 1 sequentially estimated along the travel of the vehicle 1 in the storage device 18. Specifically, the control unit 11 sets, as a teaching route R1, the travel route R during the teaching travel represented by a group of current positions sequentially estimated from a time point when the instruction to start the teaching travel mode is received until the instruction to end the teaching mode is received, and stores the teaching route data D1 representing the teaching route R1 in the storage device 18.

FIG. 6 is a diagram illustrating an example of a data configuration of teaching route data D1 according to an embodiment. The teaching route data D1 includes a group of travel information for each position which is a current position sequentially estimated during the teaching travel. The information related to the teaching route R1 includes latitude and longitude information of the teaching route R1. The travel information includes an INDEX, a travel position, an azimuth, a travel direction, and reference travel information.

The INDEX is identification information of travel information. The travel position is the estimated position of the vehicle 1. The position of the vehicle 1 is, for example, a position detected by a position detection device, and is indicated with latitude and longitude. The azimuth indicates the direction of the vehicle 1 at the position. The travel direction indicates a direction of traveling of the vehicle 1 at the position, and is represented by, for example, forward or backward. The reference travel information is information indicating a travel state or the like at the position. The reference travel information is, for example, information such as a steering angle and a vehicle speed detected at each position during teaching travel.

In addition, during teaching travel of the vehicle 1, the control unit 11 creates map data D2 for estimating the current position of the vehicle 1 from the image captured by the camera 16. As a method for estimating the current position of the vehicle 1 from the image, a simultaneous localization and mapping (SLAM) method or the like is used. The map data D2 includes latitude and longitude information detected by the position detection device 26.

Figure 7:
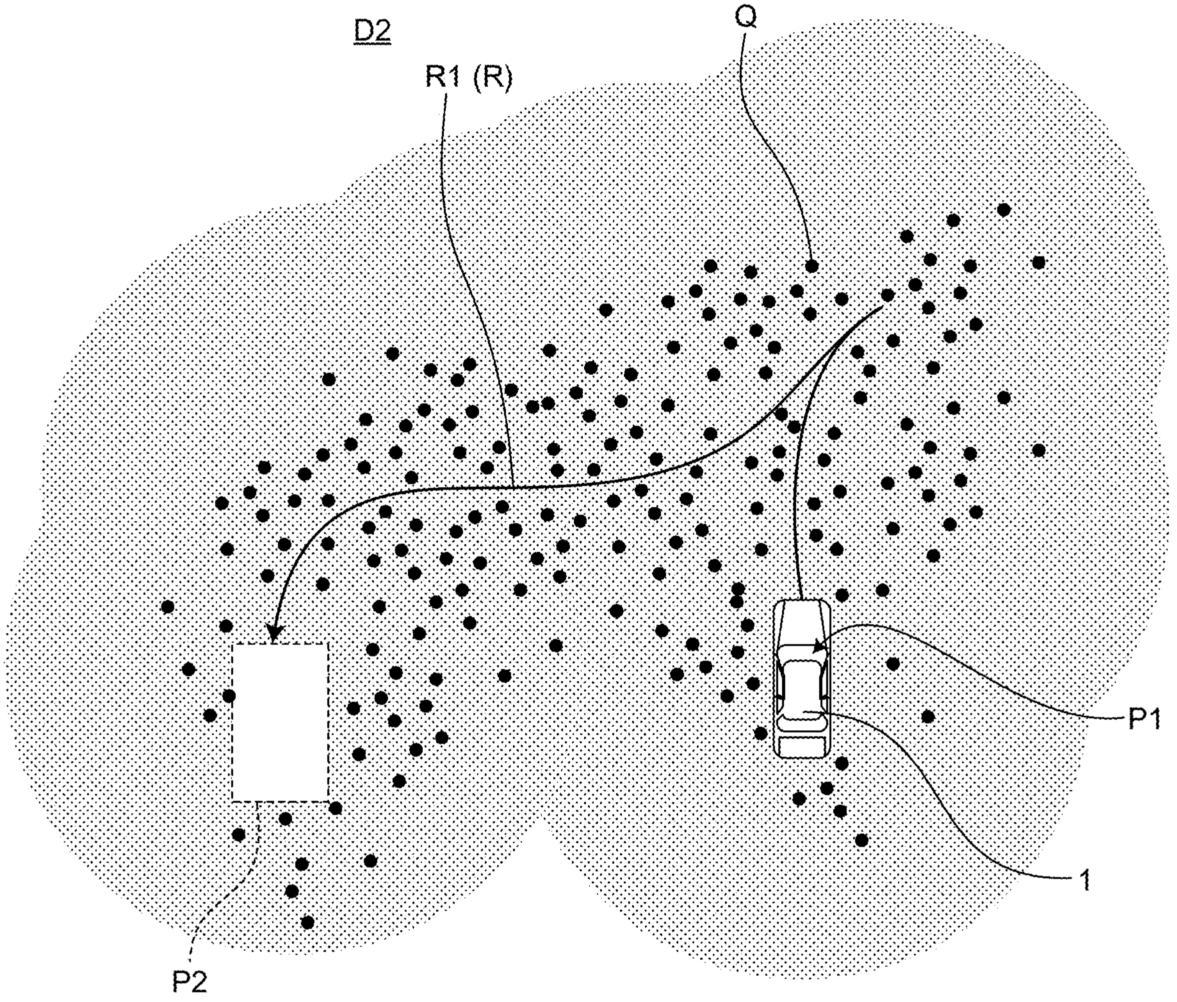
FIG. 7 is a schematic diagram of an example of map data according to an embodiment.

FIG. 7 is a schematic diagram of an example of the map data D2 according to an embodiment. In FIG. 7, the position of a feature point Q in the real space in the latitude-longitude information real view stored in the map data D2 is illustrated as a bird's-eye view. The map data D2 is map data in which plural feature points Q around the vehicle 1 at the time of traveling along the teaching route R1 are registered.

The feature point Q is a point with a specific feature obtained from the latitude-longitude information detected by the position detection device 26 during the teaching travel. In addition, the feature point Q is a point with a specific feature obtained by performing image analysis on a captured image captured by the camera 16 during the teaching travel. The feature point Q is a part where an image pattern with a specific feature can be obtained by analyzing a captured image in an object (for example, a tree, a wall, a column, or the like) or the like that can be a mark in the real view. In one example, such a part is an edge of the object. The map data D2 includes plural feature points Q, and each feature point Q is identifiably registered for each feature point Q by being assigned an identification number.

The feature point Q is represented by feature point data including latitude and longitude, a three-dimensional position, and a feature amount.

The latitude and longitude of the feature point Q are represented by, for example, a geographic coordinate system (V, W). The three-dimensional position of the feature point Q is a three-dimensional position of the feature point Q in the real space, and is represented by, for example, a three-dimensional orthogonal coordinate system (X, Y, Z).

The feature amount of the feature point Q is a feature amount of the feature point Q represented by image analysis of the captured image. The feature amount of the feature point Q is, for example, luminance and density on the captured image, a scale invariant feature transform (SIFT) feature amount, a speeded up robust features (SURF) feature amount, or the like.

In the map data D2, one feature point Q is registered for each of the same latitude and longitude and three-dimensional position. Note that, for the same three-dimensional position, a plurality of feature points Q may be registered in the map data D2 for each imaging position and imaging direction by the camera 16 at the three-dimensional position. In addition, the feature point data of the feature point Q registered in the map data D2 may further include image data of an object having the feature point Q.

During the teaching travel, the control unit 11 obtains the coordinates of the feature point Q in the real view based on, for example, stereo photogrammetry. Specifically, the control unit 11 reads a plurality of captured images captured at different timings, and correlates the same feature points Q commonly appearing in the captured images with each other. Then, the control unit 11 estimates the temporary position of the vehicle 1 when the captured images are captured, and obtains the temporary coordinates of the feature point Q in the real view on the basis of the principle of triangulation.

The control unit 11 performs bundle adjustment by using the temporary position of the vehicle 1 and the temporary coordinates of the feature point Q in the real view as reference information, and calculates the formal position of the vehicle 1 and the formal coordinates of the feature point Q in the real view so as to minimize a reprojection error when each feature point Q in the real view is projected on all the captured images. Then, the control unit 11 stores the map data D2 in which the feature point Q represented by the feature point data including the formal coordinates of the feature point Q in the real view as the latitude and longitude and the three-dimensional position is registered in the storage device 18.

The three-dimensional position of the feature point Q registered in the map data D2 may be a position measured in advance by using light detection and ranging (LiDAR) or a stereo camera without using the SLAM method. However, from the viewpoint of suppressing a decrease in position estimation accuracy, it is preferable to use the SLAM method.

Note that, as illustrated in FIG. 7, the control unit 11 may generate one piece of map data D2 including the entire teaching route R1, but may create, as the map data D2, plural pieces of partial map data at least partially non-overlapping with each other along the teaching route R1.

FIG. 8 is a schematic diagram of an example of the map data D2 according to an embodiment. In FIG. 7, the position of a feature point Q in the real space in the real view stored in the map data D2 is illustrated as a bird's-eye view. As illustrated in FIG. 8, the map data D2 may include pieces of partial map data D2P at least partially non-overlapping with each other along the teaching route R1. The feature point data of the feature point Q may be registered in each partial map data D2P in the same manner as described above.

By configuring the map data D2 with the pieces of partial map data D2P, the data capacity of the map data D2 can be reduced as compared with a case where one map data D2 including the entire teaching route R1 is created.

As described above, the control unit 11 executes the above processing in the teaching travel mode. For this reason, in the teaching travel mode, the control unit 11 generates the teaching route data D1 of the teaching route R1 obtained by the teaching travel from the first position P1 to the target parking position P2, and the map data D2 in which the latitude and longitude of each of the feature points Q, the three-dimensional position of each of the feature points Q, and the feature amount of the feature point Q in the periphery of the vehicle 1 when traveling along the teaching route R1 are registered, and stores the generated data in the storage device 18.

Switching from Manual Travel to Autonomous Travel Mode

Next, the control of the control unit 11 at the time of switching from the manual travel to the autonomous travel mode will be described in detail.

Based on the movement longitude information of the teaching route R1 and the latitude and longitude detected by the position detection device 26, the control unit 11 determines whether the vehicle 1 is in a predetermined range from the second position on the teaching route R1 during the manual travel of the vehicle 1 by the occupant's driving.

In addition, in a case where the vehicle 1 is in a predetermined range from the second position on the teaching route R1 during the manual travel of the vehicle 1 by the occupant's driving, the control unit 11 causes the monitor 22 to display a first indication indicating that the vehicle 1 is in the vicinity of a place where automatic parking is possible.

Figure 9:
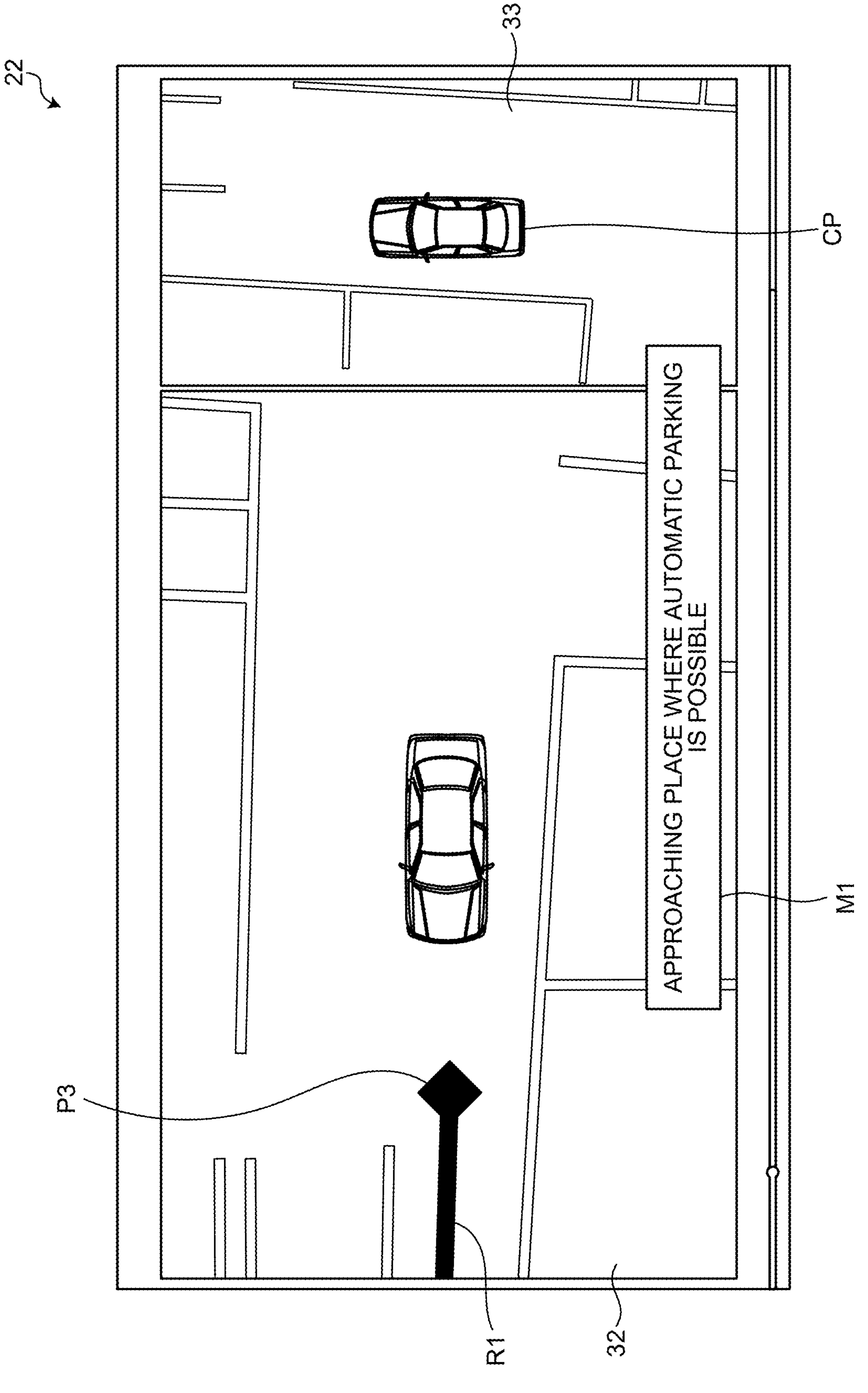
FIG. 9 is a schematic diagram illustrating an example of a display screen according to an embodiment.

The first indication will be described with reference to FIG. 9. FIG. 9 is a schematic diagram illustrating an example of a display screen according to an embodiment. The display screen of the first indication displayed by the monitor 22 is, for example, a screen in which the second position P3, the teaching route R1, and a message M1 are superimposed and displayed on an image 32.

In FIG. 9, an example in which the second position P3 is displayed by arranging an icon representing the vehicle 1 in a predetermined range of the second position P3 on the image 32 is illustrated. The second position P3 may be in the vicinity of the first position P1, or coincident with the first position P1, for example, or may be a position between the first position P1 and the target parking position P2.

In addition, in FIG. 9, an example in which a line image representing the teaching route R1 is superimposed and displayed on the image 32 is illustrated. Further, in FIG. 9, an example in which the message M1 includes "approaching place where automatic parking is possible" which is an example of a sentence indicating that the vehicle 1 is in the vicinity of the place where automatic parking is possible is illustrated. The first indication includes an indication in which at least part of the teaching route R1 is superimposed on the surrounding image acquired by the camera 16. As a result, the occupant can grasp traveling on the teaching route R1 by manual operation.

Moreover, the first indication may include an indication in which the target parking position P2 is superimposed on the surrounding image acquired by the camera 16. At this time, as the target parking position P2, for example, the target parking position P2 is displayed in a frame. Further, the display screen of the first indication may further include a screen in which an icon CP representing the current position and the current attitude of the vehicle 1 is superimposed on an image 33.

In addition, in a case where the vehicle 1 is in a predetermined range from the second position P3 on the teaching route R1 during the manual travel of the vehicle 1 by the occupant's driving, the control unit 11 may cause the monitor 22 to display the first indication indicating that the vehicle 1 is in the vicinity of a place where automatic parking is possible, and cause the speaker 24 to emit sound indicating that the vehicle 1 is in the vicinity of a place where automatic parking is possible. The sound emission is performed in conjunction with the first indication displayed by the monitor 22.

Next, in a case where the vehicle 1 is located at a third position that is closer to the target parking position P2 than the second position P3, the third position being away from the first position P1 by a predetermined distance or after traveling for a predetermined time from the second position P3 as a starting point, on the teaching route R1, the control unit 11 causes the monitor 22 to display a second indication indicating that autonomous traveling is possible up to the target parking position P2. The second indication includes an indication in which at least part of the teaching route R1 is superimposed on the surrounding image acquired by the camera 16.

Figure 10:
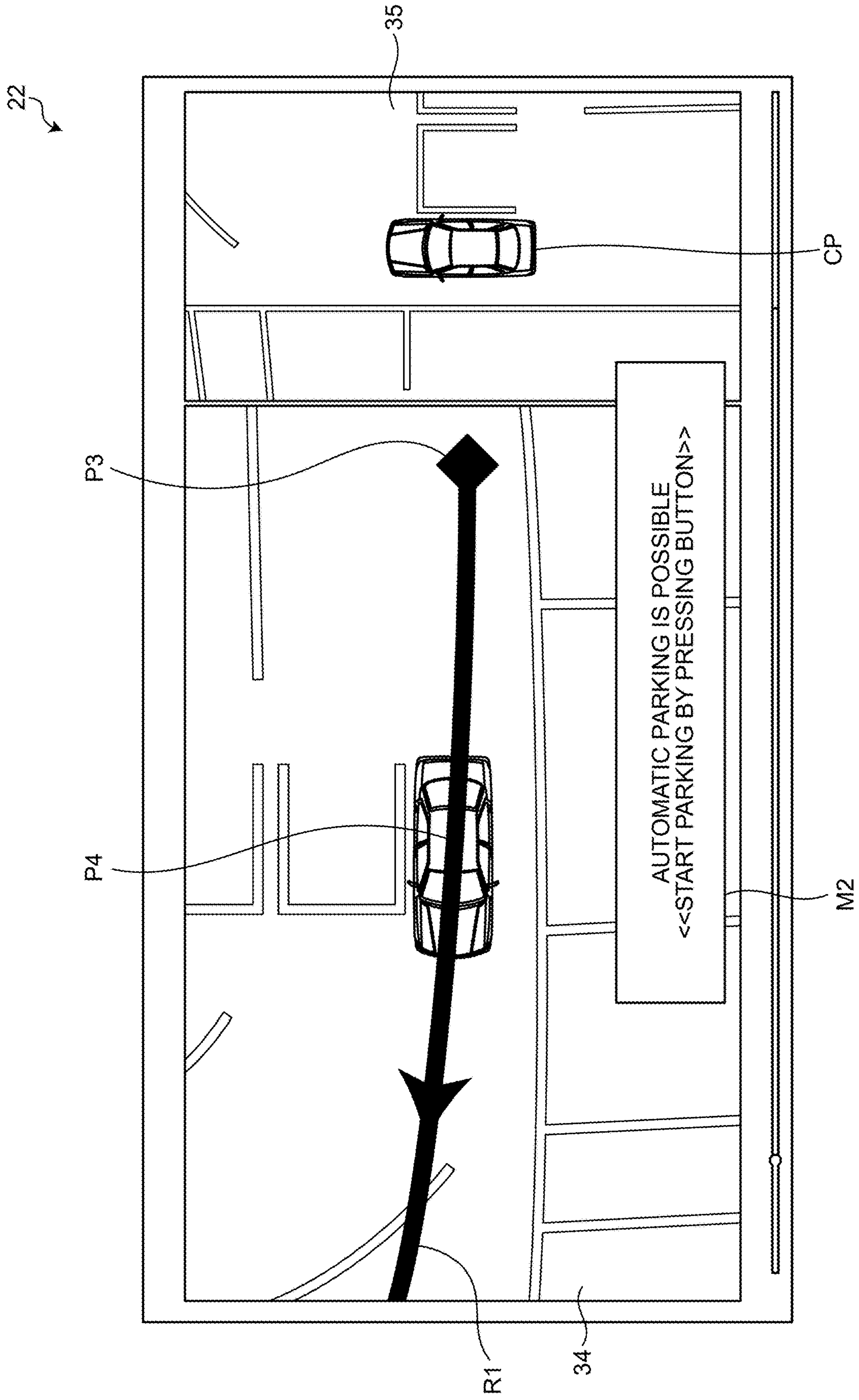
FIG. 10 is a schematic diagram illustrating an example of a display screen according to an embodiment.

The second indication will be described with reference to FIG. 10. FIG. 10 is a schematic diagram illustrating an example of a display screen according to an embodiment. The display screen of the second indication displayed by the monitor 22 is, for example, a screen in which the second position P3, the third position P4, the teaching route R1, and a message M2 are superimposed and displayed on an image 34.

In FIG. 10, an example in which the second position P3 and the third position P4 are displayed by arranging an icon representing the vehicle 1 at the third position P4 that is closer to the target parking position P2 than the second position P3, the third position P4 being away from the first position P1 by a predetermined distance or after traveling for a predetermined time from the second position P3 as a starting point, on the teaching route R1 on the image 32 is illustrated. In addition, in FIG. 10, an example in which an arrow image representing the teaching route R1 is superimposed and displayed on the image 34 is illustrated.

Moreover, in FIG. 10, an example in which the message M2 includes "automatic parking is possible" which is an example of a sentence indicating that autonomous traveling is possible up to the target parking position P2, and "start parking by pressing button" which is an example of a sentence prompting switching to the autonomous travel mode is illustrated. The second indication includes an indication in which at least part of the teaching route R1 is superimposed on the surrounding image acquired by the camera 16. As a result, the occupant can grasp traveling on the teaching route R1 by manual operation.

In addition, the second indication may include an indication indicating the target parking position P2. At this time, as the target parking position P2, for example, the target parking position P2 is schematically displayed. Moreover, the second indication includes an indication in which the target parking position P2 is superimposed on the surrounding image acquired by the camera 16. As a result, the occupant can intuitively grasp the target parking position P2. Then, the display screen of the second indication may further include a screen in which the icon CP representing the current position and the current attitude of the vehicle 1 is superimposed on an image 35.

In addition, in a case where the vehicle 1 is located at the third position P4 that is closer to the target parking position P2 than the second position P3, the third position P4 being away from the first position P1 by a predetermined distance or after traveling for a predetermined time from the second position P3 as a starting point, on the teaching route R1, the control unit 11 may cause the monitor 22 to display the second indication indicating that autonomous traveling is possible up to the target parking position P2, and cause the speaker 24 to emit sound indicating that autonomous traveling is possible. The sound emission is performed in conjunction with the second indication displayed by the monitor 22.

In Autonomous Travel Mode

Next, the control of the control unit 11 in the autonomous travel mode will be described in detail.

In a case where the operation device 20 receives a predetermined operation, the control unit 11 controls at least steering based on at least the surrounding image to cause the vehicle to autonomously travel from a fourth position closer to the target parking position P2 than the third position on the teaching route R1 to the target parking position P2. Specifically, the control unit 11 switches from the manual travel to the autonomous travel mode. Then, in a case where the operation device 20 receives a predetermined operation, the control unit 11 causes the monitor 22 to display the third indication indicating that the automatic parking function is activated, and controls at least steering based on at least the surrounding image to cause the vehicle to autonomously travel from the fourth position to the target parking position P2 on the teaching route R1.

Figure 11:
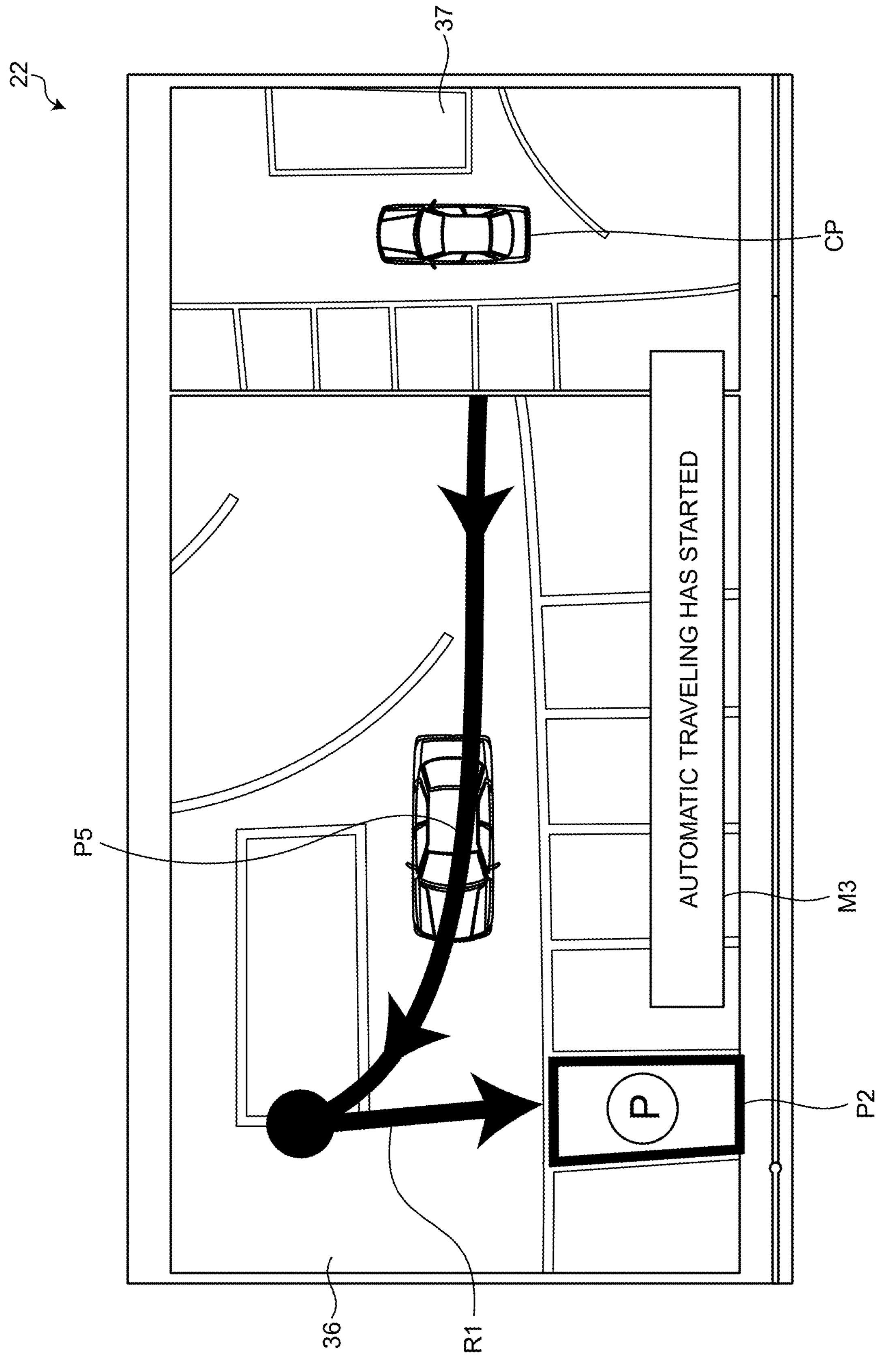
FIG. 11 is a schematic diagram illustrating an example of a display screen according to an embodiment.

The third indication will be described with reference to FIG. 11. FIG. 11 is a schematic diagram illustrating an example of a display screen according to an embodiment. The display screen of the third indication displayed by the monitor 22 is, for example, a screen in which the target parking position P2, the fourth position P5, the teaching route R1, and a message M3 are superimposed and displayed on an image 36.

In FIG. 11, an example in which an icon representing the vehicle 1 is arranged from the fourth position P5 to the target parking position P2 on the teaching route R1 on the image 36 to display the target parking position P2 and the fourth position P5 is illustrated. In addition, in FIG. 11, an example in which an arrow image representing the teaching route R1 is superimposed and displayed on the image 36 is illustrated.

Additionally, in FIG. 11, an example in which the message M3 includes "automatic traveling has started" which is an example of a sentence indicating that automatic parking function has been activated is illustrated. As a result, the occupant can grasp traveling on the teaching route R1 by autonomous traveling.

In a case where the operation device 20 receives a predetermined operation, the control unit 11 may cause the monitor 22 to display the third indication indicating that the automatic parking function has been activated, and cause the speaker 24 to emit sound indicating that the automatic parking function has been activated. The sound emission may be performed in conjunction with the third indication displayed by the monitor 22.

The vehicle 1 passes through the second position P3, the third position P4, and the fourth position P5 on the teaching route R1 toward the target parking position P2 at a speed of a positive value and larger than a predetermined value.

In addition, in a case where the operation device 20 receives a predetermined operation, for example, there is a case where the predetermined operation is slow and the mode is not switched to the autonomous travel mode in the control unit 11. At this time, the fourth indication may indicate that the automatic parking function is not activated.

Figure 12:
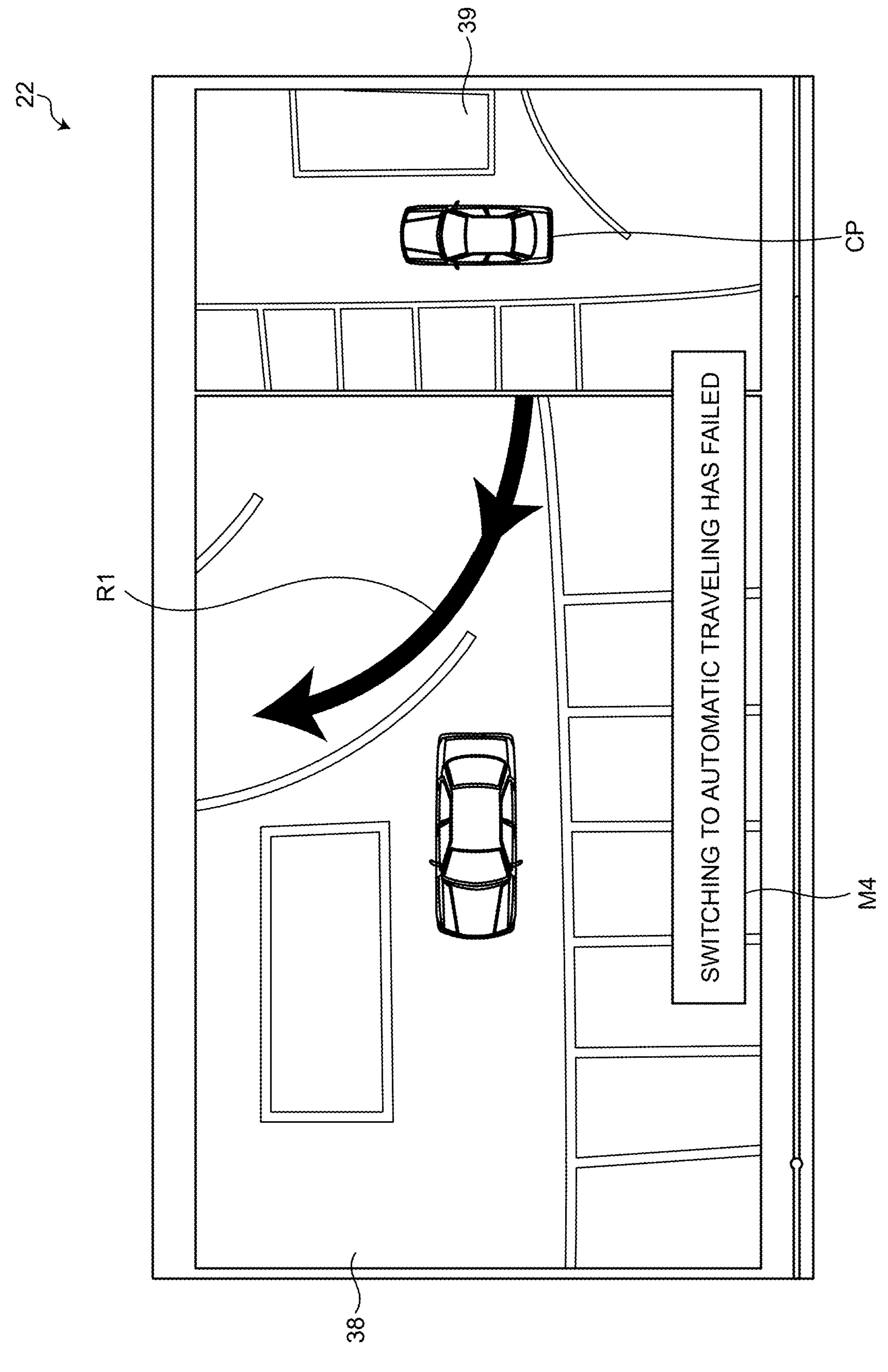
FIG. 12 is a schematic diagram illustrating an example of a display screen according to an embodiment.

The fourth indication indicating that the automatic parking function is not activated will be described with reference to FIG. 12. FIG. 12 is a view illustrating an example of a display screen according to the embodiment. The display screen of the fourth indication displayed by the monitor 22 is, for example, a screen in which the teaching route R1 and a message M4 are superimposed and displayed on an image 38.

In FIG. 12, an example in which an arrow image representing the teaching route R1 is superimposed and displayed on the image 38 is illustrated. In addition, in FIG. 12, an example in which an icon representing the vehicle 1 deviating from the teaching route R1 is arranged is illustrated. Further, in FIG. 12, an example in which the message M4 includes "switching to automatic traveling has failed" which is an example of a sentence indicating that automatic parking function has not been activated is illustrated. As a result, the occupant can grasp that the switching to the autonomous travel mode has failed.

The fact that the operation device 20 has received the predetermined operation means that the operation device 20 has acquired the input operation of the occupant. The predetermined operation is, for example, an input operation corresponding to a pushing operation by the occupant from an input device such as a push-in switch. Note that the predetermined operation is not limited thereto.

Then, the control unit 11 executes the following processing in the autonomous travel mode.

The control unit 11 reads the teaching route data D1 and the map data D2 from the storage device 18, and controls the movement control device 12 so as to perform autonomous traveling along the teaching route R1 represented by the teaching route data D1. In addition, the control unit 11 estimates the current position of the vehicle 1 on the basis of the map data D2 and the captured image of the periphery of the vehicle 1 acquired by the at least one camera 16.

Figure 13:
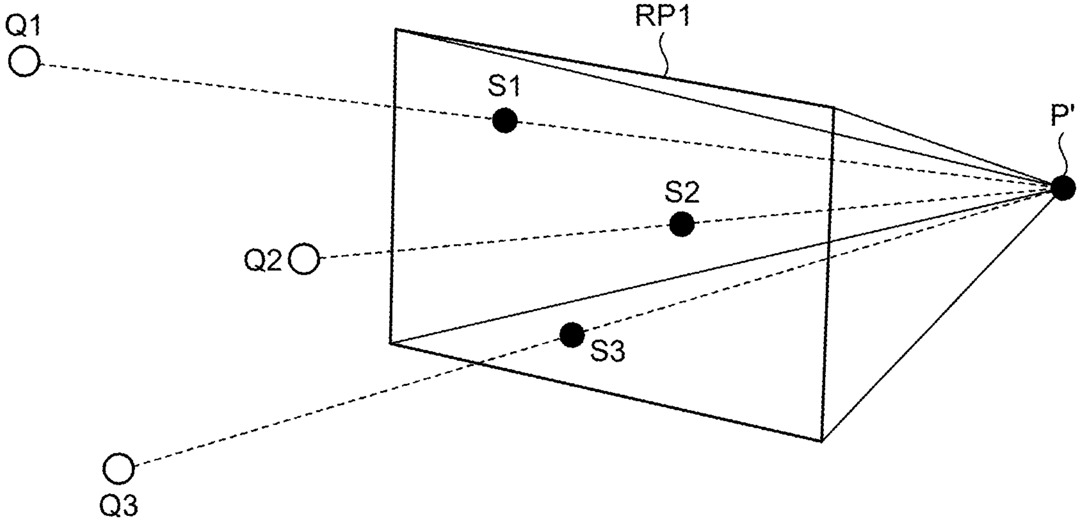
FIG. 13 is an explanatory diagram of an example of estimation processing of a current position of a vehicle executed by a control unit in an autonomous travel mode according to an embodiment.

FIG. 13 is an explanatory diagram of an example of estimation processing of a current position of the vehicle 1 executed by the control unit 11 in the autonomous travel mode according to an embodiment.

In FIG. 13, S1, S2, and S3 represent three points with specific features extracted from the captured image of the camera 16, and points Q1, Q2, and Q3 are feature points Q stored in the map data D2, and represent three-dimensional positions of the points with specific features S1, S2, and S3 on the real space. RP1 represents an imaging surface of the camera 16. A point P' represents the position of the camera 16 (that is, the position of the vehicle 1) obtained from the three points with specific features S1, S2, and S3 extracted from the captured image of the camera 16 and the feature points Q (Q1, Q2, and Q3) stored in the map data D2.

The control unit 11 first collates the points with specific features extracted from the captured image of the camera 16 with the feature points Q stored in the map data D2 by using pattern matching, feature amount search, or the like. Then, the control unit 11 randomly selects several (for example, three to six) points with specific features among the points with specific features extracted from the captured image of the camera 16 and the points with specific features that can be collated with the feature points Q stored in the map data D2.

Then, the control unit 11 estimates the current position of the vehicle 1 in the real space on the basis of the positions of the several points with specific features in the captured image and the three-dimensional positions in the real space of the feature points Q registered in the map data D2 corresponding to the several points with specific features.

At this time, the control unit 11 estimates the current position of the vehicle 1 by solving the PnP problem by using a known method such as Lambda Twist (see, for example, Mikael Persson et al. "Lambda Twist: An Accurate Fast Robust Perspective Three Point (P3P) Solver.", ECCV 2018, pp 334-349, published in 2018, http://openaccess.thecvf.com/content_ECCV_2018/papers/Mikael_Persson_Lambda_Twist_An_ECCV_2018_paper.pdf).

When the control unit 11 collates the points with specific features extracted from the captured image of the camera 16 with the feature points Q stored in the map data D2, for example, the control unit 11 may calculate the current position of the vehicle 1 as a temporary position on the basis of the movement amount of the vehicle 1 described above, and may narrow down the feature points Q to be collated with the points with specific features extracted from the captured image of the camera 16 among the feature points Q stored in the map data D2 on the basis of the temporary position.

Through these processes, the control unit 11 estimates current position information including information related to the two-dimensional position (X coordinate, Y coordinate) of the vehicle 1 and the direction of the vehicle 1 in the real space as current position information indicating the current position of the vehicle 1 on the basis of the map data D2 and the captured image of the periphery of the vehicle 1 acquired by at least one camera 16.

The control unit 11 causes the vehicle 1 to autonomously travel from the first position P1 toward the target parking position P2 along the teaching route R1 by controlling the movement control device 12 so that the estimated current position of the vehicle 1 becomes a position on the teaching route R1 represented by the teaching route data D1. Then, the control unit 11 stops the vehicle 1 at the target parking position P2.

When the vehicle 1 autonomously travels along the travel route R, the control unit 11 feedback-controls the movement control device 12 so that the vehicle 1 moves along the teaching route R1 on the basis of the estimated current position of the vehicle 1 and each position on the teaching route R1 represented by the teaching route data D1.

Figure 14:
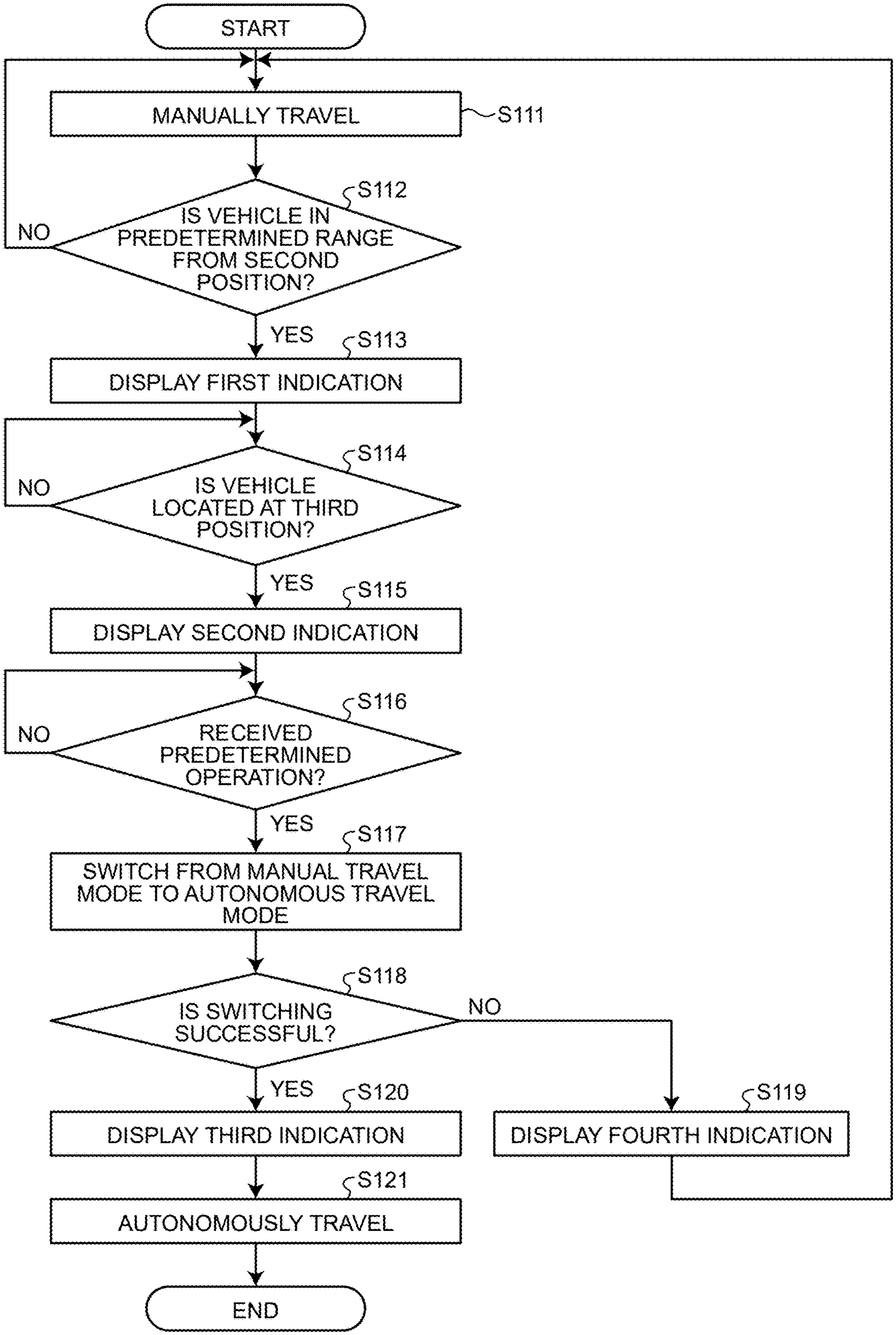
FIG. 14 is a flowchart illustrating an example of a process of information processing executed by the control unit according to the embodiment at the time of switching from the manual travel to the autonomous travel mode.

Next, an example of a process of information processing executed by the control unit 11 of the vehicle control device 10 will be described. FIG. 14 is a flowchart illustrating an example of a process of information processing executed by the control unit 11 at the time of switching from the manual travel to the autonomous travel mode.

The control unit 11 manually travels the vehicle 1 on the basis of the driving operation of the vehicle 1 by the occupant (step S111). Based on the movement longitude information of the teaching route R1 and the latitude and longitude detected by the position detection device 26, the control unit 11 determines whether the vehicle 1 is in a predetermined range from the second position P3 on the teaching route R1 during the manual travel of the vehicle 1 by the occupant's driving (step S112).

If the control unit 11 determines that there is no vehicle 1 in the predetermined range from the second position P3 on the teaching route R1 (step S112: No), the process returns to step S111. On the other hand, if the control unit 11 determines that there is the vehicle 1 in the predetermined range from the second position P3 on the teaching route R1 (step S112: Yes), the process proceeds to step S113. In step S113, the control unit 11 causes the monitor 22 to display the first indication indicating that the vehicle is in the vicinity of a place where automatic parking is possible (step S113).

The control unit 11 determines whether the vehicle 1 is located at the third position P4 that is closer to the target parking position P2 than the second position P3, the third position P4 being away from the first position P1 by a predetermined distance or after traveling for a predetermined time from the second position P3 as a starting point, on the teaching route R1 (step S114). If the control unit 11 determines that the vehicle 1 is not located at the third position P4 that is closer to the target parking position P2 than the second position P3, the third position P4 being away from the first position P1 by a predetermined distance or after traveling for a predetermined time from the second position P3 as a starting point, on the teaching route R1 (step S114: No), the process returns to step S114 and executes the processing again.

On the other hand, if the control unit 11 determines that the vehicle 1 is located at the third position P4 that is closer to the target parking position P2 than the second position P3, the third position P4 being away from the first position P1 by a predetermined distance or after traveling for a predetermined time from the second position P3 as a starting point, on the teaching route R1 (step S114: Yes), the process proceeds to step S115. In step S115, the control unit 11 causes the monitor 22 to display the second indication indicating that the autonomous traveling is possible up to the target parking position P2 (step S115).

The control unit 11 determines whether the operation device 20 has received a predetermined operation (step S116). If the control unit 11 determines that the operation device 20 has not received the predetermined operation (step $116: No), the control unit 11 returns to step S116 and executes the processing again. On the other hand, if the control unit 11 determines that the operation device 20 has received a predetermined operation (step S116: Yes), the control unit 11 proceeds to step S117. In step S117, the control unit 11 switches from the manual travel mode to the autonomous travel mode.

The control unit 11 determines whether the switching from the manual travel to the autonomous travel mode is successful (step S118). If the control unit 11 determines that the switching from the manual travel to the autonomous travel mode has failed (step S118: No), the process proceeds to step S119. On the other hand, if the control unit 11 determines that the switching from the manual travel to the autonomous travel mode is successful (step S118: Yes), the process proceeds to step S120.

In step S119, the control unit 11 causes the monitor 22 to display the fourth indication indicating that the automatic parking function is not activated (step S119). In step S120, the control unit 11 causes the monitor 22 to display the third indication indicating that the automatic parking function is activated (step S120). The control unit 11 controls at least steering based on at least the surrounding image to cause the vehicle to autonomously travel from the fourth position P5 to the target parking position P2 on the teaching route R1 (step S121). Then, the control unit 11 controls the movement control device 12 to stop the vehicle 1 at the target parking position P2, and ends this routine.

As described above, the vehicle control device 10 of the present embodiment is set to be connected to the operation device 20 that receives the operation of the occupant, the camera 16 that acquires the surrounding image, the monitor 22 that can be visually recognized by the occupant, and the movement control device 12 that controls at least the steering, and controls at least the steering based on at least the surrounding image along the teaching route R1 obtained by the teaching traveling from the first position P1 to the target parking position P2 to cause the vehicle 1 to autonomously travel to the target parking position P2.

In a case where the vehicle 1 is in a predetermined range from the second position P3 on the teaching route R1 during the manual travel of the vehicle 1 by the occupant's driving, the vehicle control device 10 causes the monitor 22 to display the first indication indicating that the vehicle 1 is in the vicinity of a place where automatic parking is possible. Next, in a case where the vehicle 1 is located at the third position P4 that is closer to the target parking position P2 than the second position P3, the third position P4 being away from the first position P1 by a predetermined distance or after traveling for a predetermined time from the second position P3 as a starting point, on the teaching route R1, the vehicle control device 10 causes the monitor 22 to display the second indication indicating that autonomous traveling is possible up to the target parking position P2. Next, in a case where the operation device 20 receives a predetermined operation, the vehicle control device 10 controls at least steering based on at least the surrounding image to cause the vehicle to autonomously travel from the fourth position P5 closer to the target parking position P2 than the third position P4 on the teaching route R1 to the target parking position P2.

As described above, in a case where the vehicle 1 is at the third position P4 closer to the target parking position P2 than the second position P3, the vehicle control device 10 of the present embodiment causes the monitor 22 to display the second indication indicating that autonomous traveling is possible up to the target parking position P2, and in a case where the operation device 20 receives a predetermined operation, causes the monitor 22 to display the third indication indicating that the automatic parking function is activated, and causes the vehicle to autonomously travel from the fourth position P5 to the target parking position P2 on the teaching route R1 by controlling at least steering based on at least the surrounding image.

Therefore, in a case where the vehicle 1 is present on the teaching route R1, the vehicle control device 10 of the present embodiment controls at least steering based on at least the surrounding image by the occupant performing a predetermined operation to cause the vehicle 1 to autonomously travel. Therefore, when starting the automatic driving, the occupant can start the automatic driving without stopping the vehicle 1 once at the start position of the automatic driving.

Therefore, the vehicle control device 10 of the present embodiment can improve the convenience of the occupant as compared with the related art when performing parking assistance or automatic parking of the vehicle 1.

Figure 15:
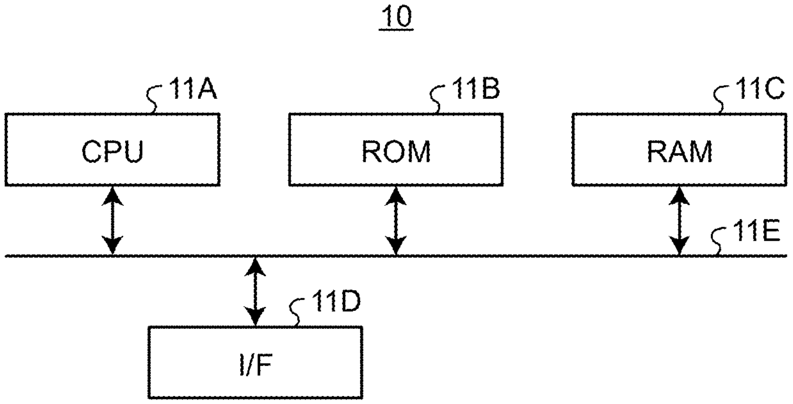
FIG. 15 is a block diagram illustrating a hardware configuration example of a vehicle control device according to an embodiment.

Next, a hardware configuration of the vehicle control device 10 of the present embodiment will be described. FIG. 15 is a block diagram illustrating a hardware configuration example of the vehicle control device 10.

In the vehicle control device 10, a central processing unit (CPU) 11A, a read only memory (ROM) 11B, a random access memory (RAM) 11C, an I/F 11D for connecting to various devices, and the like are connected to each other by a bus 11E, and a hardware configuration using a normal computer can be adopted.

The CPU 11A is an arithmetic device that controls the entire processing of the vehicle control device 10. The RAM 11C stores data necessary for various processing by the CPU 11A. The ROM 11B stores computer programs for implementing various processing by the CPU 11A. The I/F 11D is an interface that is connected to an external device or an external terminal via a communication line or the like and transmits and receives data to and from the connected external device or external terminal.

A computer program for executing the above-described various processing executed by the vehicle control device 10 is provided by being incorporated in the ROM 11B or the like in advance. The program for executing the vehicle control method executed in the present embodiment may be configured to be provided by being recorded in a computer-readable recording medium such as a CD-ROM, a flexible disk (FD), a CD-R, or a digital versatile disc (DVD) as a file in a format installable or executable in these devices.

Moreover, the program for executing the vehicle control method executed in the present embodiment may be stored in a computer connected to a network such as the Internet and provided by being downloaded via the network. In addition, the program for executing the vehicle control method executed in the present embodiment may be provided or distributed via a network such as the Internet.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicle control method implemented by a computer of a vehicle control device provided in a vehicle, the vehicle including an operation device to receive an operation of an occupant, a camera to acquire a surrounding image, a monitor being visually recognized by the occupant, and a movement control device to control at least steering, the vehicle control method being implemented for causing the vehicle to execute autonomous traveling to a target parking position by controlling the at least steering based on at least the surrounding image along a teaching route obtained by teaching traveling from a first position to the target parking position, the vehicle control method comprising:

- causing the monitor to display a first indication indicating that the vehicle is in the vicinity of a place where automatic parking is possible, the first indication being displayed in a case where the vehicle is in a predetermined range from a second position on the teaching route during manual travel of the vehicle by driving of the occupant;
- causing the monitor to display a second indication indicating that autonomous traveling is possible up to the target parking position, the second indication being displayed in a case where the vehicle is located at a third position on the teaching route that is closer to the target parking position than the second position, the third position being away from the first position by a predetermined distance or after traveling for a predetermined time from the second position as a starting point; and
- controlling, when the operation device receives a predetermined operation, at least steering based on at least the surrounding image to cause the vehicle to autonomously travel from a fourth position that is closer to the target parking position than the third position on the teaching route to the target parking position.

2. The vehicle control method according to claim 1, further comprising:

- causing the monitor to display a third indication indicating that an automatic parking function is activated, the third indication being displayed in a case where the operation device receives the predetermined operation; and
- controlling the at least steering based on at least the surrounding image to cause the vehicle to autonomously travel from the fourth position to the target parking position on the teaching route.

3. The vehicle control method according to claim 1, wherein the vehicle passes through the second position, the third position, and the fourth position on the teaching route toward the target parking position at a speed of a positive value that is larger than a predetermined value.

4. The vehicle control method according to claim 1, wherein the first indication includes an indication in which at least part of the teaching route is superimposed on a surrounding image acquired by the camera.

5. The vehicle control method according to claim 4, wherein the first indication includes an indication in which the target parking position is superimposed on the surrounding image acquired by the camera.

6. The vehicle control method according to claim 1, wherein the second indication includes an indication in which at least part of the teaching route is superimposed on a surrounding image acquired by the camera.

7. The vehicle control method according to claim 1, wherein the second indication includes an indication indicating the target parking position.

8. The vehicle control method according to claim 6, wherein the second indication includes an indication in which the target parking position is superimposed on a surrounding image acquired by the camera.

9. The vehicle control method according to claim 1, wherein

- the vehicle further includes a speaker to emit sound toward the occupant, and
- the vehicle control method further comprises, in a case where the vehicle is in the predetermined range from the second position on the teaching route during manual travel of the vehicle by driving of the occupant,
  - causing the monitor to display the first indication indicating that the vehicle is in the vicinity of a place where automatic parking is possible, and
  - causing the speaker to emit sound indicating that the vehicle is in the vicinity of the place where automatic parking is possible.

10. The vehicle control method according to claim 1, wherein

- the vehicle further includes a position detection device to detect at least latitude and longitude,
- information related to the teaching route includes latitude and longitude information of the teaching route, and
- the vehicle control method further comprises determining whether the vehicle is in a predetermined range from the second position on the teaching route during manual travel of the vehicle by driving of the occupant, the determining being performed based on the latitude-longitude information of the teaching route and the latitude-longitude detected by the position detection device.

11. A vehicle control device to be provided in a vehicle, the vehicle including an operation device to receive an operation of an occupant, a camera to acquire a surrounding image, a monitor being visually recognized by the occupant, and a movement control device to control at least steering, the vehicle control device comprising

- a processor coupled to a memory and configured to:
  - cause the vehicle to execute autonomous traveling to a target parking position by controlling the at least steering based on at least the surrounding image along a teaching route obtained by teaching traveling from a first position to the target parking position;
  - cause the monitor to display a first indication indicating that the vehicle is in the vicinity of a place where automatic parking is possible, the first indication being displayed in a case where the vehicle is in a predetermined range from a second position on the teaching route during manual travel of the vehicle by driving of the occupant;
  - cause the monitor to display a second indication indicating that autonomous traveling is possible up to the target parking position, the second indication being displayed in a case where the vehicle is located at a third position on the teaching route that is closer to the target parking position than the second position, the third position being away from the first position by a predetermined distance or after traveling for a predetermined time from the second position as a starting point; and control, when the operation device receives a predetermined operation, at least steering based on at least the surrounding image to cause the vehicle to autonomously travel from a fourth position that is closer to the target parking position than the third position on the teaching route to the target parking position.

12. The vehicle control device according to claim 11, wherein the processor is configured to:

cause the monitor to display a third indication indicating that an automatic parking function is activated, the third indication being displayed in a case where the operation device receives the predetermined operation; and control the at least steering based on at least the surrounding image to cause the vehicle to autonomously travel from the fourth position to the target parking position on the teaching route.

13. The vehicle control device according to claim 11, wherein the vehicle passes through the second position, the third position, and the fourth position on the teaching route toward the target parking position at a speed of a positive value that is larger than a predetermined value.

14. The vehicle control device according to claim 11, wherein the first indication includes an indication in which at least part of the teaching route is superimposed on a surrounding image acquired by the camera.

15. The vehicle control device according to claim 14, wherein the first indication includes an indication in which the target parking position is superimposed on the surrounding image acquired by the camera.

16. The vehicle control device according to claim 11, wherein the second indication includes an indication in which at least part of the teaching route is superimposed on a surrounding image acquired by the camera.

17. The vehicle control device according to claim 11, wherein the second indication includes an indication indicating the target parking position.

18. The vehicle control device according to claim 16, wherein the second indication includes an indication in which the target parking position is superimposed on a surrounding image acquired by the camera.

19. The vehicle control device according to claim 11, wherein the vehicle further includes a speaker to emit sound toward the occupant, and the processor is configured to, in a case where the vehicle is in the predetermined range from the second position on the teaching route during manual travel of the vehicle by driving of the occupant, cause the monitor to display the first indication indicating that the vehicle is in the vicinity of a place where automatic parking is possible, and cause the speaker to emit sound indicating that the vehicle is in the vicinity of the place where automatic parking is possible.

20. The vehicle control device according to claim 11, wherein the vehicle further includes a position detection device to detect at least latitude and longitude, information related to the teaching route includes latitude and longitude information of the teaching route, and the processor is configured to determine whether the vehicle is in a predetermined range from the second position on the teaching route during manual travel of the vehicle by driving of the occupant, the determination being performed based on the latitude-longitude information of the teaching route and the latitude-longitude detected by the position detection device.

* * * * *